INVENTOR
Clarence Kaufman

Patented Feb. 3, 1953

2,627,319

UNITED STATES PATENT OFFICE 2,627,319

ENGINE VALVE OILING MECHANISM

Clarence Kaufman, Butler, Mo.

Application February 1, 1949, Serial No. 73,937

1 Claim. (Cl. 184—6)

This invention relates to valve oilers and is particularly directed to a valve oiling arrangement which is inexpensive and simple in mechanical construction and easy to install in association with the usual valve mechanism of a tractor or other engine.

The invention is particularly adapted for oiling the stems of reciprocatory exhaust valves of tractor and like engines for the purpose of keeping the exhaust valves lubricated and to reduce carbonization and prevent the valves from becoming hot and sticky, thereby preventing engine trouble and reducing repair and other operating cost.

It has been heretofore proposed to circulate oil from the valve rocker shaft into a special cup attached to the stem of a reciprocatory exhaust valve but such devices have not gone into wide use because they require extensive modification of the original engine parts and additional expensive parts, resulting in an expensive attachment with attendant complicated installation operations which cannot be carried out by the ordinary farm mechanic. The present invention is so simple that it can be installed and placed in operation in a short time by an unskilled mechanic.

It is therefore a major object of my invention to provide a novel valve oiler mechanism which is inexpensive, simple in mechanical construction, easy to install in association with conventional valve mechanism and which does not interfere with the oil pressure supplied to the valve rocker arm of the engine.

A further object of the invention is to provide a novel oil receiving and distributing attachment and arrangement surrounding each valve stem in an engine for continuously lubricating the valve during operation of the engine.

Figure 1:
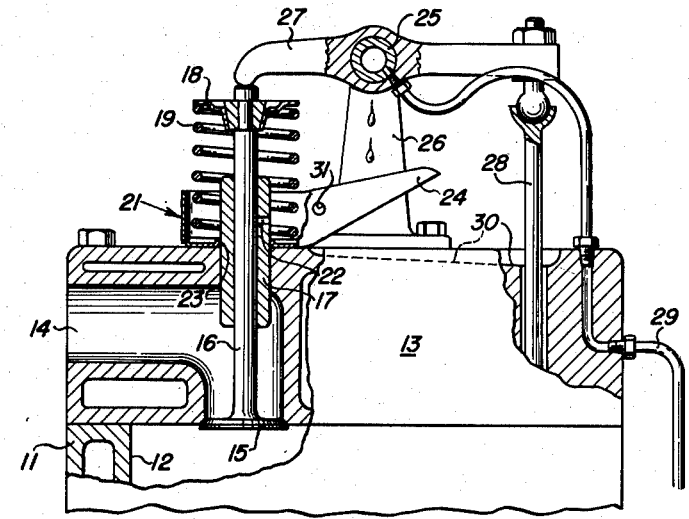
Figure 2:
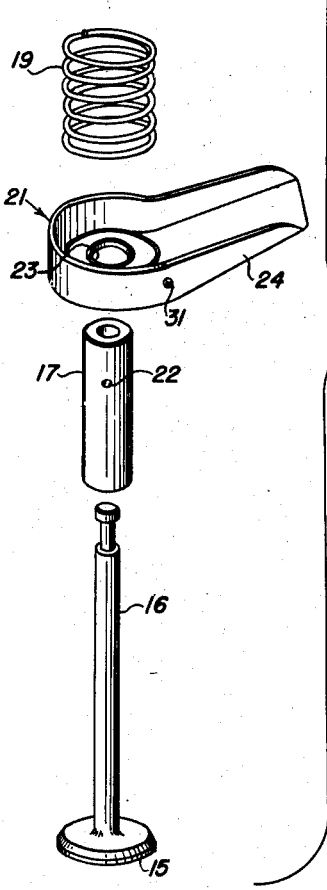

Further objects of the invention will presently appear as the description proceeds in connection with the appended claims and the annexed drawings wherein:

Figure 1 is a fragmentary elevation chiefly in section of an exhaust valve and associated rocker arm for operating it, with the valve attachment of the invention introduced into the lubrication system for the rocker arm; and Figure 2 is an exploded view of the valve and oiler parts arranged according to the invention, the oil trough and the modified valve guide sleeve being the only departures from conventional construction.

Referring to Figure 1, an engine block 11 containing a plurality of cylinders 12 which are adapted to contain a plurality of reciprocating pistons (not shown) has a head 13 bolted to it. Head 13 is formed with a series of exhaust passages 14, at least one leading to each cylinder, and each passage 14 is formed at its inner end with a seat which is closed by the circular head 15 of a poppet valve having an elongated cylindrical stem 16 that extends vertically upwardly through a stationary guide sleeve 17 non-rotatably and tightly secured in a suitable bore in head 13. Sleeve 17 projects a short distance above the top surface of head 13, and valve stem 16 projects through and above the top of sleeve 17.

It will be understood that the valve and valve supporting and operating mechanism illustrated in Figure 1 are illustrative of the several exhaust valves which are used in conjunction with the several cylinders of the engine, the number of exhaust valves depending on the number of cylinders of the engine. Illustration of the mechanism in association with one of the valves is believed ample for purposes of disclosure of the invention.

The upper end of valve stem 16 has secured to it above sleeve 17 a keeper plate 18 which provides an abutment longitudinally fixed with respect to the valve stem 16 and against which reacts the upper end of a coil compression spring 19 that surrounds shaft 16 and sleeve 17 above head 13. In a conventional tractor engine the lower end of spring 19 would react against a similar keeper loosely surrounding the projecting upper end of sleeve 17, but in this invention that conventional keeper is replaced by a trough-shaped device 21 which serves not only as a lower spring keeper but also to receive oil for the lubrication of valve stem 16. This device 21, in conjunction with a special aperture 22 drilled in the sleeve above head 13, constitutes the preferred structural embodiment of the invention.

In practicing the invention, I provide the trough-shaped device 21 with an aperture 23 in its bottom wall which is preferably such as to have substantially force fit over the upper end of sleeve 17. Trough 21 is forced down over the upper end of sleeve 17 so that it rests in oil tight-relation on the flat top surface of the engine head 13 as shown in Figure 1. Trough 21 has a projecting inclined lip 24 which extends laterally outwardly to intercept overflow oil which drips in the usual way from bearings on a rocker shaft 25 that is journalled on supports 26 upstanding from the top of the engine head. Shaft 25 is mounted in a plurality of these supports, and has journaled thereupon at spaced intervals corresponding to the number of the exhaust valves a series of rocker arms 27, which at one end are adapted to abut the upper end of valve stem 16 and have their opposite ends formed to coact with a reciprocatory push rod 28 that is driven by the engine cam shaft.

As is illustrated in Figure 1, a conduit 29, uprising along the side of the engine from a suitable pump (not shown) in the crank case, is connected to the bearings of shaft 25 so as to supply lubricating oil under pressure to internal and radial passages in shaft 25, and excess oil not required for the lubrication of the rocker arms is allowed to drop freely downward toward the top of the head 13. In the usual construction found in tractor and other engines, head 13 is formed with a conducting groove 30 which leads this overflow oil back to lubricate the push rod and thence into the crank case for reuse. In the present invention I intercept this overflow oil before it drops into groove 30 and collect it in the body of trough 21 for use in lubricating the valve stem 16.

Sleeve 17 is provided a suitable distance above the bottom wall of the trough 21 with radial hole 22 at a predetermined level, whereby oil collecting in the body of trough 21 may be metered to slowly enter the space within sleeve 17 between the peripheries of the sleeve and valve stem 16 and descend along the valve for lubricating the valve and cooling it. If desired, a plurality of holes 22 may be provided at the same level in order to provide uniform and sufficient lubrication around the valve stem, but I have found that one hole may be enough since the oil tends to distribute itself by capillary action within the sleeve and during the up and down movement of valve stem 16.

Trough 21 is also provided at a level slightly higher than the hole 22 with one or more apertures 31 which are preferably in lip 24 above groove 30, by which oil escapes from the trough after it has reached a predetermined level above hole 22, since hole 22 is of such size that oil collects in the trough faster than it is dispensed to the valve stem. Oil escaping from aperture or apertures 31 falls into groove 30, and is then conducted back into the crank case just as in the case of the conventional construction. Thus it will be seen that my essential departure from conventional construction is that I provide an intercepting trough in which oil is stored for lubricating the valve stem and I have provided an overflow for the trough whereby excess oil goes back into the engine lubrication system.

After the system has been in operation for a period of time and when the oil level in the trough 21 fills up to the level of aperture 31, the return of oil to the crank case is substantially continuous. The relative sizes of apertures 22 and 31 and their number and relative location can be readily determined to suit any quantity of oil supply to the valve stem, and the excess oil from the trough can be let back into the crank case in a controlled manner. In usual practice, a steel cover may be provided over the top of head 13 covering the entire valve and oiler mechanism so that there is little danger of grit or other particles becoming mixed with the oil flowing across the top of the head.

In one embodiment of the invention I found it satisfactory to provide 1/8" diameter circular apertures at 22 and 31.

My novel mechanism is inexpensive and easy to install. A set of instructions supplied with purchase of the trough can be carried out after only a single drilling operation to provide aperture 22. This is a simple foolproof valve oiling mechanism which is easily replaced or repaired or cleaned, and which is not complicated or expensive.

My novel valve oiling mechanism, in addition to oiling the valve stem, also provides a lubricated bearing for the bottom of the spring 19 which thereby increases the life of the same and reduces repairs necessary to valve maintenance.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced there.

What is claimed and desired to be secured by United States Letters Patent is:

In an engine valve oiling mechanism wherein a valve stem reciprocates vertically in the bore of a fixed sleeve projecting above the engine head block and is controlled by a push rod actuated rocker mounted on a horizontal shaft above the head and oil is supplied to a rocker shaft bearing and permitted to drop freely back toward the head, and a groove is provided in the head for receiving and directing the oil to the push rod to lubricate the push rod and be returned to the crankcase, an attachment comprising a trough press fitted onto said sleeve and seated against said head so as to define with said sleeve an open-topped receptacle having an offset upwardly and angularly extending guide lip projecting from one side of the trough over said groove into the path of said freely dropping oil to receive said oil and deliver the oil to said trough, a radial metering passage in said sleeve below the top of said trough for admitting some of said oil to said bore for lubricating the valve stem, and an aperture in said angular lip overlying said groove a predetermined distance above said passage whereby excess oil is utilized by flowing out of said aperture into said groove to lubricate said push rod and be returned to the engine crankcase for reuse.

CLARENCE KAUFMAN.

REFERENCES CITED

The following references are of record in the file of this patent:

UNITED STATES PATENTS

| Number | Name | Date |
|---|---|---|
| 1,356,914 | Fekete | Oct. 26, 1920 |
| 1,370,346 | Nelson | Mar. 1, 1921 |
| 1,545,948 | Dooley | July 14, 1925 |
| 1,871,623 | Le Fevre | Aug. 16, 1932 |

FOREIGN PATENTS

| Number | Country | Date |
|---|---|---|
| 316,430 | Great Britain | Aug. 1, 1929 |
| 602,018 | France | Dec. 16, 1925 |